United States Patent
Park et al.

(10) Patent No.: US 11,791,458 B2
(45) Date of Patent: Oct. 17, 2023

(54) ANODE ACTIVE MATERIAL FOR LITHIUM SECONDARY BATTERY, ANODE ACTIVE MATERIAL SLURRY AND LITHIUM SECONDARY BATTERY INCLUDING THE SAME

(71) Applicant: SK ON CO., LTD., Seoul (KR)

(72) Inventors: Gwi Ok Park, Daejeon (KR); Ju Ho Chung, Daejeon (KR); Joon Sup Kim, Daejeon (KR); Eun Jun Park, Daejeon (KR); Dong Il Jang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 153 days.

(21) Appl. No.: 17/494,884

(22) Filed: Oct. 6, 2021

(65) Prior Publication Data

US 2022/0263071 A1    Aug. 18, 2022

(30) Foreign Application Priority Data

Feb. 18, 2021    (KR) .......................... 10-2021-0021719

(51) Int. Cl.
*H01M 4/485* (2010.01)
*H01M 4/36* (2006.01)
(Continued)

(52) U.S. Cl.
CPC ........... *H01M 4/366* (2013.01); *H01M 4/483* (2013.01); *H01M 4/587* (2013.01);
(Continued)

(58) Field of Classification Search
CPC ...... H01M 4/366; H01M 4/483; H01M 4/587; H01M 10/0525; H01M 2004/027; H01M 2220/20; H01M 4/625; H01M 4/48; H01M 4/131; H01M 4/1391; H01M 10/052; Y02E 60/10
See application file for complete search history.

(56) References Cited

U.S. PATENT DOCUMENTS

2011/0244333 A1    10/2011 Kawada
2013/0280614 A1    10/2013 Lee et al.
(Continued)

FOREIGN PATENT DOCUMENTS

CN    103579593 A    2/2014
CN    105580171 A    5/2016
(Continued)

OTHER PUBLICATIONS

Uhl et al., "An ab initio study of the O1s and Mg1s, Mg2s, Mg2p core electron binding energies in bulk MgO", Journal of Electron Spectroscopy and Related Phenomena, 2019, pp. 90-96, vol. 233.
(Continued)

*Primary Examiner* — Cynthia K Walls
(74) *Attorney, Agent, or Firm* — THE WEBB LAW FIRM

(57) ABSTRACT

According to embodiments of the present invention, there is provided an anode active material for a lithium secondary battery including a silicon oxide which includes a carbon coating layer on a surface thereof and is doped with magnesium. A ratio of peak area at 1303 eV to a sum of a peak area at 1304.5 eV and a peak area at 1303 eV, which appear in a Mg1s spectrum when measuring by X-ray photoelectron spectroscopy (XPS), is 60% or less.

11 Claims, 1 Drawing Sheet

Examples 1

Comparative Example 2

(51) Int. Cl.
  *H01M 4/48* (2010.01)
  *H01M 10/0525* (2010.01)
  *H01M 4/587* (2010.01)
  *H01M 4/02* (2006.01)

(52) U.S. Cl.
  CPC .. *H01M 10/0525* (2013.01); *H01M 2004/027* (2013.01); *H01M 2220/20* (2013.01)

(56) References Cited

U.S. PATENT DOCUMENTS

| | | | |
|---|---|---|---|
| 2014/0170485 | A1 | 6/2014 | Lee et al. |
| 2017/0187032 | A1 | 6/2017 | Chang et al. |
| 2017/0222222 | A1 | 8/2017 | Lee et al. |
| 2018/0090750 | A1* | 3/2018 | Oh .................. H01M 4/483 |
| 2018/0175377 | A1 | 6/2018 | Hirose et al. |
| 2019/0140262 | A1 | 5/2019 | Kim et al. |
| 2019/0319261 | A1 | 10/2019 | Uchiyama et al. |
| 2021/0028438 | A1 | 1/2021 | Lee et al. |

FOREIGN PATENT DOCUMENTS

| | | |
|---|---|---|
| CN | 109301232 A | 2/2019 |
| CN | 111129455 A | 5/2020 |
| CN | 111164803 A | 5/2020 |
| JP | 201073349 A | 4/2010 |
| JP | 5212094 B2 | 6/2013 |
| JP | 5406799 B2 | 2/2014 |
| KR | 1020130045212 A | 5/2013 |
| KR | 1020150128592 A | 11/2015 |
| KR | 1020160104720 A | 9/2016 |
| KR | 1020150112746 A | 11/2016 |
| KR | 1020170078203 A | 7/2017 |
| KR | 101783047 B1 | 9/2017 |
| KR | 1020180019569 A | 2/2018 |
| KR | 1020180103594 A | 9/2018 |
| KR | 1020190052514 A | 5/2019 |
| KR | 1020190140610 A | 12/2019 |
| WO | 2018101072 A1 | 6/2018 |

OTHER PUBLICATIONS

Uhl et al., "An ab initio study of the O1s and Mg1s, Mg2s, Mg2p core electron binding energies in bulk MgO", Journal of Electron Spectroscopy and Related Phenomena, 2019, Supporting Information, pp. 1-14.

* cited by examiner

[FIG. 1]
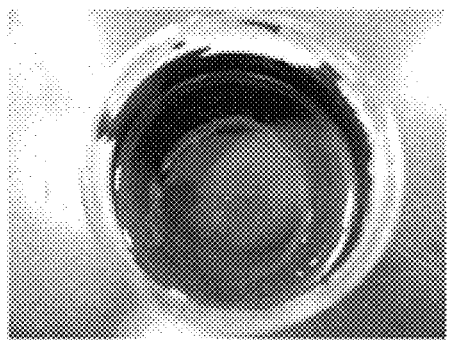 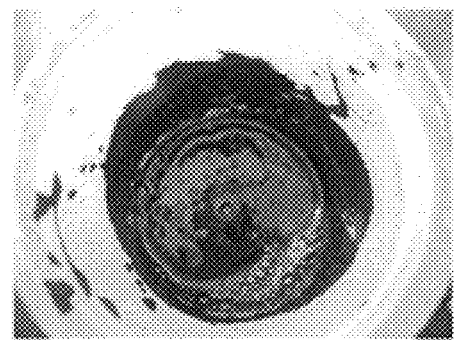
Examples 1        Comparative Example 2
[FIG. 2]
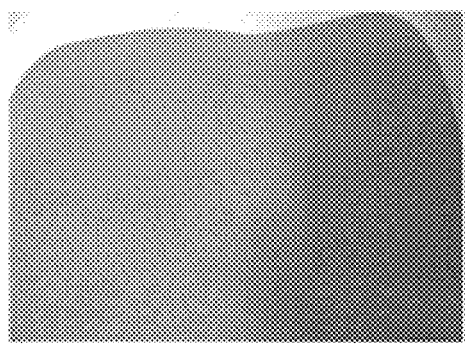 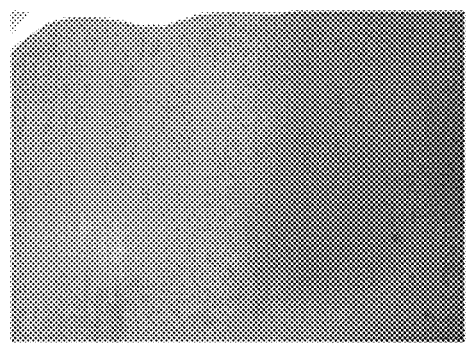
Examples 1        Comparative Example 2

ANODE ACTIVE MATERIAL FOR LITHIUM SECONDARY BATTERY, ANODE ACTIVE MATERIAL SLURRY AND LITHIUM SECONDARY BATTERY INCLUDING THE SAME

CROSS-REFERENCE TO RELATED APPLICATION

This application claims priority to Korean Patent Application No. 10-2021-0021719 filed Feb. 18, 2021, the disclosure of which is hereby incorporated by reference in its entirety.

BACKGROUND OF THE INVENTION

1. Field of the Invention

The present invention relates to an anode active material for a lithium secondary battery, an anode active material slurry including the same, and a lithium secondary battery. More specifically, the present invention relates to a silicon oxide anode active material, an anode active material slurry including the same, and a lithium secondary battery.

2. Description of the Related Art

A secondary battery is a battery that can be repeatedly charged and discharged, and is widely applied as a power source for portable electronic communication devices such as camcorders, mobile phones, and notebook PCs with the development of information communication and display industries. Also, recently, a battery pack including a secondary battery has been developed and applied as a power source for an eco-friendly vehicle such as a hybrid vehicle.

Examples of the secondary battery may include a lithium secondary battery, a nickel-cadmium battery, a nickel-hydrogen battery and the like. In particular, when applying the lithium secondary battery to a hybrid vehicle, it is advantageous in terms of a charging speed and light weight due to a high operating voltage and a high energy density per unit weight.

Such a lithium secondary battery may include: an electrode assembly including a cathode, an anode, and a separation membrane (separator); and an electrolyte in which the electrode assembly is impregnated. In addition, the lithium secondary battery may further include, for example, a pouch-shaped outer case in which the electrode assembly and the electrolyte are housed.

Recently, with the development of the electric vehicle industry, development for a lithium secondary battery having a high energy density has been proceeded so that the electric vehicle can run long distance on a single charge. Silicon oxide used as an anode active material for a lithium secondary battery currently applied in the art has a low efficiency, such that there is a limit to increase the energy density. Accordingly, various studies have been attempted to improve the energy density by doping silicon with magnesium metal.

For example, Korean Patent Registration No. 10-1783047 relates to an anode material in which surfaces of powders containing at least one of silicon oxide and silicon-silicon oxide composite is coated with carbon, and then doped with magnesium. In this case, magnesium is exposed and remains on the surface of the anode active material, which causes an increase in pH and a shrinkage of a thickener during preparation of an anode active material slurry, and thereby it is difficult to manufacture a desired high-density electrode.

PRIOR ART DOCUMENT

Patent Document

Korean Patent Registration Publication No. 10-1783047

SUMMARY OF THE INVENTION

One object of the present invention is to provide an anode active material for a lithium secondary battery, which has high energy density and excellent electrode manufacturing stability.

In addition, another object of the present invention is to provide an anode active material slurry including the anode active material for a lithium secondary battery.

Further, another object of the present invention is to provide a lithium secondary battery including the anode active material for a lithium secondary battery.

To achieve the above objects, according to an aspect of the present invention, there is provided an anode active material for a lithium secondary battery including: a silicon oxide which comprises a carbon coating layer formed on a surface thereof, and is doped with magnesium, wherein a ratio of peak area at 1303 eV to a sum of a peak area at 1304.5 eV and a peak area at 1303 eV, which appear in a Mg1s spectrum when measuring by X-ray photoelectron spectroscopy (XPS), is 60% or less.

In some embodiments, a content of magnesium hydroxide remaining on the surface may be less than 0.05% by weight based on a total weight of the silicon oxide.

In some embodiments, a content of magnesium hydroxide remaining on the surface may be 0% by weight or more but less than 0.05% by weight based on the total weight of the silicon oxide.

In some embodiments, a content of the doped magnesium may be 7 to 17% by weight based on the total weight of the silicon oxide.

In some embodiments, a carbon content in the coating layer may be 3 to 12% by weight based on the total weight of the silicon oxide.

In some embodiments, the silicon oxide may be $SiO_x$ ($0<x<2$).

In some embodiments, the silicon oxide may have a silicon crystal average particle diameter of 20 nm or less.

In some embodiments, the silicon oxide may have a silicon crystal average particle diameter of 0.1 nm to 20 nm.

In some embodiments, the carbon of the coating layer may include amorphous carbon, carbon nanofibers, carbon nanotubes, graphite, graphene, graphene oxide, reduced graphene oxide, or a mixture thereof.

In addition, according to another aspect of the present invention, there is provided an anode active material slurry for a lithium secondary battery, including the anode active material.

In some embodiments, the slurry may have a pH of less than 10.

In some embodiments, the slurry may have a pH of 7 or more but less than 10.

In some embodiments, the slurry may have a viscosity of 4,000 cPs or more.

In some embodiments, the slurry may have a viscosity of 4,000 cPs to 9,000 cPs.

In addition, according to another aspect of the present invention, there is provided a lithium secondary battery including: a cathode; and an anode which comprises the anode active material for a lithium secondary battery.

According to the above-described exemplary embodiments, the anode active material for a lithium secondary battery includes a silicon oxide doped with magnesium, and the silicon oxide includes a carbon coating layer on the surface thereof, wherein a ratio of peak area at 1303 eV to a sum of a peak area at 1304.5 eV and a peak area at 1303 eV, which appear in a Mg1s spectrum when measuring by X-ray photoelectron spectroscopy (XPS), is 60% or less, such that stability may be secured during preparation of an anode active material slurry.

According to some exemplary embodiments, the anode active material slurry may have a pH maintained in a low range of 10 or less to prevent the slurry viscosity from being reduced, and by ensuring a viscosity of 4,000 centipoise (cps) or more, it may help to secure the stability of the slurry.

According to some exemplary embodiments, the anode active material slurry having excellent stability may provide excellent uniformity during manufacturing the anode.

According to some exemplary embodiments, the anode active material for a secondary battery may implement a lithium secondary battery having high energy density characteristics and excellent electrochemical properties.

BRIEF DESCRIPTION OF THE DRAWINGS

The above and other objects, features and other advantages of the present invention will be more clearly understood from the following detailed description taken in conjunction with the accompanying drawings, in which:

FIG. 1 is photographs showing slurries including anode active materials according to an exemplary embodiment and a comparative example; and FIG. 2 is photographs showing coated electrodes according to the exemplary embodiment and the comparative example.

DESCRIPTION OF THE INVENTION

According to embodiments of the present invention, there is provided an anode active material for a lithium secondary battery including a silicon oxide which includes a carbon coating layer on a surface thereof and is doped with magnesium, wherein a ratio of peak area at 1303 eV to a sum of a peak area at 1304.5 eV and a peak area at 1303 eV, which appear in a Mg1s spectrum when measuring by X-ray photoelectron spectroscopy (XPS), is 60% or less.

Further, embodiments according to the present invention provide a lithium secondary battery including a cathode; an anode including the anode active material for a lithium secondary battery; and a separation membrane interposed between the cathode and the anode.

Hereinafter, exemplary embodiments of the present invention will be described in detail with reference to the accompanying drawings. However, these embodiments are merely an example, and the present invention is not limited to the specific embodiments described as the example.

<Anode Active Material for Lithium Secondary Battery>

The anode active material for a lithium secondary battery (hereinafter, may be abbreviated as an anode active material) according to an embodiment of the present invention may include a silicon oxide doped with magnesium. In addition, the surface of the silicon oxide may include a carbon coating layer, and the magnesium may remain on the surface of the silicon oxide during the doping process. The magnesium remaining on the surface may be, for example, magnesium hydroxide $Mg(OH)_2$. A content of the magnesium hydroxide may be measured by a peak area appearing in a spectrum according to X-ray photoelectron spectroscopy (XPS) or by acid titration.

According to an embodiment of the present invention, the content of magnesium hydroxide remaining on the surface of the silicon oxide measured through the X-ray photoelectron spectroscopy (XPS) may be provided as a ratio of magnesium hydroxide to a sum of magnesium oxide and magnesium hydroxide. In addition, the content of the magnesium hydroxide may be confirmed through acid titration.

That is, the present invention is intended to provide that the ratio of magnesium hydroxide remaining on the surface of the silicon-based anode active material measured according to an embodiment of the present invention is a technical indicator capable of confirming the stability of the electrode and the electrochemical properties of the secondary battery.

According to an embodiment of the present invention, the anode active material for a lithium secondary battery may include a silicon oxide doped with magnesium, and the surface of the silicon oxide may include a carbon coating layer, wherein a ratio of peak area at 1303 eV to a sum of a peak area at 1304.5 eV and a peak area at 1303 eV, which appear in a Mg1s spectrum when measuring by X-ray photoelectron spectroscopy (XPS), may be 60% or less.

According to an embodiment, the content of magnesium hydroxide remaining on the surface may be less than 0.05% by weight ('wt. %'), and preferably 0 wt. %, based on a total weight of the silicon oxide. More specifically, 1 g of a silicon oxide is added to 99 g of water, stirred for 3 minutes, and titrated with 0.1M HCl while confirming the content of residual magnesium at room temperature, which may be calculated by Equation 1 below.

[Equation 1]

$$Mg(OH)_2(aq) + 2HCl(aq) \rightarrow MgCl_2(aq) + 2H_2O(l) \quad \text{Equivalent point 1}$$

$$MgCO_3(aq) + 2HCl(aq) \rightarrow MgCl_2(aq) + 2H_2O(l) + CO_2 \quad \text{Equivalent point 2}$$

In addition, the contents of $MgCO_3$ and $Mg(OH)_2$ may be calculated by measuring according to the following equation from the content of 0.1M HCl titrated from the equivalence point 1 to the equivalence point 2.

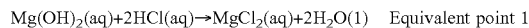

$Mg(OH)_2$ content: (Titrated amount (Equivalent point 1)×HCl concentration×$Mg(OH)_2$ molecular weight)/(Sample weight ½)    (1)

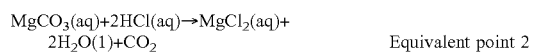

$MgCO_3$ content: (Titrated amount (Equivalent point 2−Equivalent point 1)×HCl molar concentration×$MgCO_3$ molecular weight)/(Sample weight ½)    (2)

In some embodiments, when the value according to Equation 1 is less than 0.05 wt. %, gas is generated during preparation of the anode active material slurry, thereby solving the problem that physical properties of the slurry are changed.

$Mg(OH)_2$ in the residual magnesium on the surface meets with water during preparation of the anode active material slurry to increase the pH. When the pH of the slurry is increased, carboxymethyl cellulose (CMC) acting as a thickener is shrunk, and the viscosity of the slurry is decreased. Ultimately, this may cause problems when manufacturing the electrode.

In addition, as shown Reaction Scheme 1 below, hydroxide (OH—) ions generated in the slurry react with silicon (Si) to generate hydrogen gas.

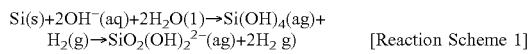

[Reaction Scheme 1]

When hydrogen gas is generated to form bubbles in the slurry, it is difficult to uniformly coat the current collector with the slurry. This may adversely affect the electrochemical properties of the secondary battery. That is, silicon acting as an active material is consumed due to the influence of hydroxide ions in the slurry, thereby reducing the discharge capacity. In this case, a result contrary to the purpose of using the silicon oxide as an active material in order to increase the energy density may be caused.

Therefore, according to exemplary embodiments of the present invention, when the anode active material for a lithium secondary battery includes a silicon oxide doped with magnesium, and the surface of the silicon oxide includes a carbon coating layer, wherein a ratio of peak area at 1303 eV to a sum of a peak area at 1304.5 eV and a peak area at 1303 eV, which appear in a Mg1s spectrum when measuring by X-ray photoelectron spectroscopy (XPS), is 60% or less, the above-described problems may be solved.

In addition, according to an embodiment of the present invention, when the content of magnesium hydroxide remaining on the surface of the silicon oxide satisfies a range of less than 0.05 wt. % based on the total weight of the silicon oxide, such the problems may be solved.

In some embodiments, the coating of the carbon coating layer may be formed by thermal decomposition of the organic material when the organic material is subjected to heat treatment under a non-oxidizing atmosphere.

In some embodiments, the coating of the coating layer may be formed by thermally treating the organic material on the surface of the silicon oxide by chemical vapor deposition (CVD) at 800° C. to 1,000° C. under an atmosphere of gas and/or vapor. At this time, when the process temperature is less than 800° C., crystallization of carbon on the surface of the silicon oxide may not be sufficiently performed. In addition, when the process temperature exceeds 1,000° C., the silicon crystal particle diameter of the silicon oxide is increased to 20 nm or more, and thereby life-span characteristics of the secondary battery may be reduced.

In some embodiments, the organic material may be a single or mixture of hydrocarbons such as methane, ethane, ethylene, acetylene, propane, butane, butene, pentane, isobutane, hexane, cyclohexane, etc.; monocyclic to tricyclic aromatic hydrocarbons such as benzene, toluene, xylene, styrene, ethylbenzene, diphenylmethane, naphthalene, phenol, cresol, nitrobenzene, chlorobenzene, indene, coumaron, pyridine, anthracene, phenanthrene, or a mixture thereof, etc.

In addition, for example, gas light oil, creosote oil, anthracene oil, and tar oil produced by naphtha cracking, which are obtained in a tar distillation process, may also be used alone or as a mixture thereof.

In some embodiments, the carbon content of the carbon coating layer may be 3 to 12 wt. % based on the total weight of the silicon oxide. When providing the carbon coating in the above range, it is possible to impart appropriate conductivity to the anode active material, and since gas is not generated during preparation of the anode active material slurry, it is possible to manufacture an electrode having excellent uniformity.

The carbon of the coating layer may include amorphous carbon, carbon nanofibers, carbon nanotubes, natural graphite, artificial graphite, graphene, graphene oxide, reduced graphene oxide, or a mixture thereof.

After the carbon coating, the silicon oxide is doped with magnesium. The magnesium doping may be provided by mixing the silicon oxide coated with carbon and a magnesium compound, and then heating the mixture at a doping temperature of 900° C. to 1,000° C.

Herein, the mixing is not particularly limited, but a mixing device such as a tumbler mixer may be used, and the mixing may be performed under an inert atmosphere. After the mixing, doping is performed at 900° C. to 1,000° C., such that magnesium doping may sufficiently performed. When the temperature during doping is less than 900° C., Mg-silicate phases resulted from magnesium as a doping element, are not stably formed, such that an increase in initial efficiency may be insignificant. When the temperature exceeds 1,000° C., there is a problem that the silicon crystal is increased larger than necessary to cause a decrease in the life-span characteristics.

In some embodiments, after doping with magnesium, the prepared silicon oxide may be washed with a washing solvent. The washing solvent may be, for example, water, an organic solvent such as ethanol, methanol, acetone, hexane, etc., an acid such as acetic acid, citric acid, hydrochloric acid, nitric acid, sulfuric acid, etc., or a mixture thereof.

In some exemplary embodiments, the magnesium compound used for doping may be magnesium (Mg), magnesium hydroxide ($Mg(OH)_2$), magnesium carbonate ($MgCO_3$), or a mixture thereof.

In some embodiments, when the magnesium doping content is 7 to 17 wt. % based on the total weight of the silicon oxide, gas is not generated during preparation of the anode active material slurry, and when coating the current collector with the silicon oxide, it may be uniformly applied thereto to secure stability of the electrode.

That is, according to the present invention, by adjusting the carbon amount contained in the silicon oxide coating layer, the heat treatment temperature during doping with magnesium, the magnesium doping amount and $Mg(OH)_2$ ratio, etc., it is possible to provide effects that gas is not generated during preparation of the anode active material slurry, and thereby it may be used as a technical indicator to confirm the stability of the electrode and the electrochemical properties of the secondary battery.

In some embodiments, the silicon oxide may be $SiO_x$ (0<x<2). In general, there are problems that, as the value of x is decreased, the battery capacity is increased and battery life-span is decreased, while as the value of x is increased, the battery capacity is decreased and the energy density of the electrode is decreased. Accordingly, in the present invention, when x is within the above range, it is possible to secure the energy density while achieving the desired capacity of the battery.

In some embodiments, the silicon oxide may have a silicon crystal particle diameter of 20 nm or less, and preferably, 0.1 nm to 20 nm. If the silicon crystal particle diameter of the silicon oxide is 20 nm or less, when the doped metal reacts with silicon during charging, expansion of the active material may be suppressed, thus to improve life-span characteristics of the battery. In addition, the silicon crystal particle diameter may be calculated from full width at half maximum (FWHM) of a silicon peak measured at 2θ of 28.5°, 47.5°, and 56.0° after measuring the silicon-based anode active material by XRD (X-ray diffraction, Cu anode source).

<Anode Active Material Slurry for Lithium Secondary Battery>

According to embodiments of the present invention, the anode active material slurry may be prepared by mixing and stirring the anode active material and a binder mixture together with a conductive material, a thickener, etc. in a solvent.

For example, examples of the conductive material may include a carbon-based conductive material such as carbon black, graphene, carbon nanotubes, etc., and/or a metal-based conductive material such as tin, tin oxide, titanium oxide, or a perovskite material such as $LaSrCoO_3$, and $LaSrMnO_3$. Examples of the thickener may include, for example, carboxymethyl cellulose (CMC).

In some embodiments, a content of the anode active material may be about 90 to 98 wt. %, a content of the binder mixture may be about 1 to 5 wt. %, a content of the conductive material may be about 0.5 to 5 wt. %, and a content of the thickener may be about 0.5 to 5 wt. % based on a total weight of the anode active material slurry.

In exemplary embodiments, the anode active material slurry may have a pH of less than 10, and preferably, the pH thereof is 7 or more but less than 10. When the pH of the anode active material slurry is 10 or more, carboxymethyl cellulose (CMC) used as the thickener is shrunk to reduce the viscosity of the slurry, which may cause difficulties in fabrication of the electrode. On the other hand, when the pH of the anode active material slurry is less than 7, a problem of reducing the viscosity of the slurry occurs. In particular, at pH 5 or less, a reduction in the viscosity of the slurry is further deepened, and at pH 2 to 3 or less, a precipitation problem may occur. Therefore, when the pH range is less than 10, preferably the pH is 7 or more but less than 10, it is possible to provide a viscosity of the slurry which is advantageous for preparation of the electrode. The slurry may have a viscosity of 4,000 centipoise (cPs) or more, and preferably, 4,000 cPs to 9,000 cPs. If the viscosity is out of the above range, it may be difficult to uniformly disperse the components in the slurry and a problem of causing a deterioration in the quality of the electrode may occur.

<Lithium Secondary Battery>

According to embodiments of the present invention, the lithium secondary battery may include an electrode assembly including: a cathode, an anode including the anode active material; and a separation membrane interposed between the cathode and the anode. The electrode assembly may be housed and impregnated together with an electrolyte in a case.

The cathode may include a cathode active material layer formed by applying a cathode active material to a cathode current collector. The cathode active material may include a compound capable of reversibly intercalating and deintercalating lithium ions.

In exemplary embodiments, the cathode active material may include a lithium transition metal oxide. For example, the lithium transition metal oxide includes nickel (Ni), and may further include at least one of cobalt (Co) and manganese (Mn).

For example, the lithium-transition metal oxide may be represented by Formula 1 below.

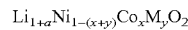 [Formula 1]

In Formula 1, a, x and y may be in a range of $-0.05 \leq a \leq 0.15$, $0.01 \leq x \leq 0.3$, and $0.01 \leq y \leq 0.3$, and M may be at least one element selected from Mn, Mg, Sr, Ba, B, Al, Si, Ti, Zr and W.

A cathode active material slurry may be prepared by mixing the cathode active material with a binder, a conductive material and/or a dispersant in a solvent, followed by stirring the same. The slurry may be coated on the cathode current collector, followed by drying and compressing to manufacture the cathode.

The cathode current collector may include, for example, stainless steel, nickel, aluminum, titanium, copper, or an alloy thereof, and preferably includes aluminum or an aluminum alloy.

The binder may be selected from, for example, an organic binder such as vinylidene fluoride-hexafluoropropylene copolymer (PVDF-co-HFP), polyvinylidene fluoride (PVDF), polyacrylonitrile, polymethyl methacrylate, etc., or an aqueous binder such as styrene-butadiene rubber (SBR), and may be used together with a thickener such as carboxymethyl cellulose (CMC).

For example, a PVDF-based binder may be used as a binder for a cathode. In this case, an amount of the binder for forming the cathode active material layer may be reduced and an amount of the cathode active material may be relatively increased, thereby improving the output and capacity of the secondary battery.

The conductive material may be included to facilitate electron transfer between the active material particles. For example, the conductive material may include a carbon-based conductive material such as graphite, carbon black, graphene, or carbon nanotubes and/or a metal-based conductive material such as tin, tin oxide, titanium oxide, or a perovskite material such as $LaSrCoO_3$, and $LaSrMnO_3$.

The anode may include an anode current collector and an anode active material layer formed by coating the anode current collector with a composition for an anode including the above-described anode active material.

In addition, the composition for the anode may include an acrylic polymer binder and styrene-butadiene rubber (SBR) as a binder mixture.

For example, the composition for the anode may be prepared in the form of an anode active material slurry by mixing and stirring the anode active material and the binder mixture together with a conductive material, a thickener, etc. in a solvent. The slurry may be coated on at least one surface of the anode current collector, followed by drying and compressing to manufacture the anode.

The separation membrane may be interposed between the cathode and the anode. The separation membrane may include, for example, a porous polymer film made of a polyolefin polymer such as ethylene homopolymer, propylene homopolymer, ethylene/butene copolymer, ethylene/hexene copolymer, ethylene/methacrylate copolymer. In addition, the separation membrane may include a nonwoven fabric made of glass fiber having a high melting point, polyethylene terephthalate fiber or the like.

In some embodiments, the anode may have an area and/or volume (e.g., a contact area with the separation membrane) larger than those/that of the cathode. Thereby, lithium ions generated from the cathode may smoothly move to the anode without being precipitated in the middle, for example. Therefore, effects of improving the capacity and output by using the above-described anode active material may be more easily implemented.

According to exemplary embodiments, an electrode cell is defined by the cathode, the anode, and the separation membrane, and a plurality of electrode cells are stacked to form, for example, a jelly roll type electrode assembly. For example, the electrode assembly may be formed by winding, laminating, folding, or the like of the separation membrane.

An electrode assembly may be housed together with an electrolyte in an outer case to define the lithium secondary battery. According to exemplary embodiments, a non-aqueous electrolyte may be used as the electrolyte.

The non-aqueous electrolyte includes a lithium salt of an electrolyte and an organic solvent, and the lithium salt is represented by, for example, $Li^+X^-$, and as an anion ($X^-$) of the lithium salt, $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2-$, $CH_3CO_2^-$, $SCN^-$ and $(CF_3CF_2SO_2)_2N^-$, etc. may be exemplified.

As the organic solvent, for example, propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulforane, γ-butyrolactone, propylene sulfite, tetrahydrofurane, and the like may be used. These compounds may be used alone or in combination of two or more thereof.

Electrode tabs (a cathode tab and an anode tab) may protrude from the cathode current collector and the anode current collector, respectively, which belong to each electrode cell, and may extend to one side of the outer case. The electrode tabs may be fused together with the one side of the outer case to form electrode leads (a cathode lead and an anode lead) extending or exposed to an outside of the case.

The lithium secondary battery may be manufactured, for example, in a cylindrical shape using a can, a square shape, a pouch type or a coin shape.

Hereinafter, specific experimental examples are proposed to facilitate understanding of the present invention. However, the following examples are only given for illustrating the present invention and those skilled in the art will obviously understand that various alterations and modifications are possible within the scope and spirit of the present invention. Such alterations and modifications are duly included in the appended claims.

Preparative Example 1: Preparation of Silicon-Based Anode Active Material

In order to form a coating layer on a surface of a silicon oxide (SiO, Sigma-Aldrich Co.), ethylene was subjected to CVD (heat treatment) at 900° C. to form a silicon oxide having the surface coated with carbon. The silicon oxide was mixed with magnesium hydroxide ($Mg(OH)_2$) and then heated to dope the same with magnesium. Then, the silicon oxide doped with magnesium was washed in distilled water for 10 minutes to prepare an anode active material for a lithium secondary battery.

The carbon coating amount of the prepared silicon-based anode active material was measured using a CS analyzer (CS844) of LECO Co., and the content of doped magnesium was measured using an inductively coupled plasma emission spectrometer (ICP-OES, Optima 8300) of Perkin-Elmer Co.

In addition, as described in Table 1 below, anode active materials of Examples 1 to 6 and Comparative Examples 1 to 4 were prepared by varying conditions of the carbon coating amount, the magnesium doping amount, the heat treatment temperature during doping, and the $Mg(OH)_2$ ratio.

TABLE 1

|  | Magnesium doping amount (wt. %) | Carbon coating amount (wt. %) | Heat treatment temperature (° C.) | XPS - Mg1s scan area | | $Mg(OH)_2$ ratio |
| --- | --- | --- | --- | --- | --- | --- |
|  |  |  |  | MgO | $Mg(OH)_2$ |  |
| Example 1 | 7 | 3 | 900 | 9205 | 3974 | 30.2% |
| Example 2 | 7 | 5 | 900 | 4936 | 4723 | 48.9% |
| Example 3 | 7 | 6 | 900 | 8557 | 4135 | 32.6% |
| Example 4 | 17 | 4 | 1000 | 5304 | 3617 | 40.5% |
| Example 5 | 17 | 12 | 1000 | 5714 | 3520 | 38.1% |
| Example 6 | 13 | 4 | 1000 | 3705 | 4967 | 57.3% |
| Comparative Example 1 | 0 | 3 | 700 | 0 | 0 | — |
| Comparative Example 2 | 13 | 4 | 900 | 1569 | 6829 | 81.3% |
| Comparative Example 3 | 13 | 8 | 900 | 2387 | 5959 | 71.4% |
| Comparative Example 4 | 13 | 12 | 900 | 2641 | 5738 | 68.5% |

Preparative Example 2: Preparation of Anode Active Material Slurry

An anode active material slurry was prepared by mixing the anode active material prepared according to the conditions of Table 1, graphite, carbon nanotube (CNT) as a conductive agent, carboxymethyl cellulose (CMC) as a binder mixture, and an SBR binder in a ratio of 84.0:13.0:0.3:1.2:1.5 parts by weight.

Experimental Example 1

(1) X-Ray Photoelectron Spectroscopy (XPS)

X-ray photoelectron spectroscopy analysis was performed on the silicon-based anode active material prepared according to the conditions of Table 1 above. The X-ray photoelectron spectroscopy was performed using an X-ray of Al k alpha beam at a voltage of 1486.68 eV with a beam size of 650 μm. The analysis was performed using a CAE mode.

A method of calculating an XPS-Mg1s scan area is as follows. After measuring the XPS of the active material, the Mg1s spectrum was deconvoluted to calculate an area of the peak located at 1304.5 eV as an area of MgO, and an area of the peak located at 1303 eV as an area of $Mg(OH)_2$. Thereafter, the $Mg(OH)_2$ ratio was calculated as follows, and results thereof are described in Table 2 below.

(1) XPS-Mg1s Scan Area Ratio

A ratio of the peak area at 1303 eV to a sum of the peak area at 1304.5 eV and the peak area at 1303 eV, which appear in the Mg1s spectrum when measuring by X-ray photoelectron spectroscopy (XPS), was calculated.

(2) Confirmation of Whether Gas is Generated

The gas generation of the anode active material slurry prepared according to Preparative Example 2 was confirmed by visually observing bubbles formed in the slurry.

(3) Measurement of pH

A pH was measured at room temperature by a pH meter after adding 1 g of silicon oxide as an anode active material to 99 g of water and stirring the mixture for 3 minutes.

(4) Measurement of Viscosity

A viscosity of the prepared slurry was measured by a Brookfield viscometer (spindle type: CZ-52, torque 60-67%, 25.0° C.)

[Equation 1]

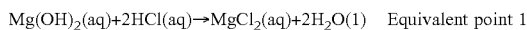

$Mg(OH)_2(aq) + 2HCl(aq) \rightarrow MgCl_2(aq) + 2H_2O(l)$   Equivalent point 1

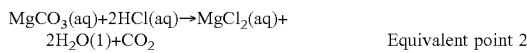

$MgCO_3(aq) + 2HCl(aq) \rightarrow MgCl_2(aq) + 2H_2O(l) + CO_2$   Equivalent point 2

In addition, the contents of $MgCO_3$ and $Mg(OH)_2$ may be calculated by measuring according to the following equation from the content of 0.1M HCl titrated from the equivalence point 1 to the equivalence point 2.

$Mg(OH)_2$ content: (Titrated amount (Equivalent point 1)×HCl concentration×$Mg(OH)_2$ molecular weight)/(Sample weight ½)   (1)

$MgCO_3$ content: (Titrated amount (Equivalent point 2−Equivalent point 1)×HCl molar concentration×$MgCO_3$ molecular weight)/(Sample weight ½)   (2)

TABLE 2

| | Presence or absence of gas generation | pH | Viscosity (cPs) | XPS - Mg1s scan area MgO | XPS - Mg1s scan area Mg(OH)$_2$ | Mg(OH)$_2$ ratio |
|---|---|---|---|---|---|---|
| Example 1 | X | 7.6 | 6320 | 9205 | 3974 | 30.2% |
| Example 2 | X | 7.8 | 5227 | 4936 | 4723 | 48.9% |
| Example 3 | X | 7.6 | 5733 | 8557 | 4135 | 32.6% |
| Example 4 | X | 8.2 | 4975 | 5304 | 3617 | 40.5% |
| Example 5 | X | 7.4 | 5413 | 5714 | 3520 | 38.1% |
| Example 6 | X | 8.4 | 4824 | 3705 | 4967 | 57.3% |
| Comparative Example 1 | X | 7.0 | 5530 | 0 | 0 | — |
| Comparative Example 2 | ○ | 11.1 | 1347 | 1569 | 6829 | 81.3% |
| Comparative Example 3 | ○ | 11.0 | 1625 | 2387 | 5959 | 71.4% |
| Comparative Example 4 | ○ | 9.2 | 1930 | 2641 | 5738 | 68.5% |

In the case of Examples 1 to 6, when controlling the magnesium doping amount, the carbon amount in the coating layer, the heat treatment temperature during doping, and the $Mg(OH)_2$ ratio is less than 60%, it can be visually confirmed that gas is not generated because bubbles are not formed during manufacturing the anode active material slurry.

In addition, it is possible to prevent the pH from being increased during preparation of the anode active material slurry, which means that it is possible to prevent the viscosity from being reduced due to a shrinkage of the thickener, thus to ensure stability during preparation of the electrode.

On the other hand, it can be confirmed that, in the case of Comparative Example 1, since the anode active material slurry was not doped with magnesium, no gas was generated, and gas was generated as the $Mg(OH)_2$ ratio exceeded 60.

Experimental Example 2

The residual magnesium content of the anode active material slurry prepared in Preparative Example 2 was confirmed according to Equation 1 below. The presence or absence of gas generation, pH, and viscosity are the same as in Table 2.

TABLE 3

| | Presence or absence of gas generation | pH | Viscosity (cPs) | Residual magnesium content (wt. %) Mg(OH)$_2$ | Residual magnesium content (wt. %) MgCO$_3$ |
|---|---|---|---|---|---|
| Example 1 | X | 7.6 | 6320 | 0 | 0.05 |
| Example 2 | X | 7.8 | 5227 | 0 | 0.09 |
| Example 3 | X | 7.6 | 5733 | 0 | 0.07 |
| Example 4 | X | 8.2 | 4975 | 0 | 0.14 |
| Example 5 | X | 7.4 | 5413 | 0 | 0.16 |
| Example 6 | X | 8.4 | 4824 | 0 | 0.15 |
| Comparative Example 1 | X | 7.0 | 5530 | 0 | 0 |
| Comparative Example 2 | ○ | 11.1 | 1347 | 0.25 | 0.26 |
| Comparative Example 3 | ○ | 11.0 | 1625 | 0.11 | 0.19 |
| Comparative Example 4 | ○ | 9.2 | 1930 | 0.05 | 0.17 |

As proposed in Examples 1 to 6, when the magnesium doping amount, the carbon amount in the coating layer, and the heat treatment temperature during doping were adjusted and calculated according to Equation 1 above, if $Mg(OH)_2$ satisfies a range of less than 0.05 wt. %, it can be confirmed that gas is not generated because bubbles are not formed during preparation of the anode active material slurry.

In addition, it is possible to prevent the pH from being increased during preparation of the anode active material slurry, thus to ensure stability during preparation of the electrode.

On the other hand, it can be confirmed that, in Comparative Example 1, since the anode active material slurry was not doped with magnesium, no gas was generated, and in the comparative examples, since the anode active material slurry included 0.05 wt. % or more of Mg(OH)$_2$, gas was generated.

As a result, in the light of the XPS-Mg1s scan area ratio or the content of magnesium residues remaining on the surface of the silicon-based anode active material measured according to Equation 1, it is possible to confirm the stability of the electrode.

Experimental Example 3

Photographs showing the anode active material slurries (Example 1 and Comparative Example 2) prepared according to Preparative Example 2 is illustrated in FIG. 1. In the case of Example 1, it can be confirmed that no gas is generated, and in the case of Comparative Example 2, it can be visually confirmed that bubbles are formed, thereby gas is generated.

In addition, a photograph showing the coated electrodes, in which copper current collectors are coated with the anode active material slurries (Example 1 and Comparative Example 2) prepared according to Preparative Example 2, is illustrated in FIG. 2. It can be seen that the electrode coated with the slurry of Example 1 in which bubbles are not formed has a uniformly coated surface, whereas it can be seen that the electrode coated with the slurry of Comparative Example 2 in which bubbles are formed has an unevenly coated surface due to the bubbles.

Experimental Example 4

A coated electrode was prepared using the anode active material slurry prepared according to Preparative Example 2, and then a lithium (Li) coin half-cell was prepared and electrochemical properties such as charge capacity, discharge capacity and initial efficiency were measured.

A lithium coin half-cell was formed by interposing a separation membrane (polyethylene, thickness 20 μm) between the prepared anode-coated electrode and lithium metal (thickness 2 mm). A combination of lithium metal/separation membrane/anode was placed in a coin cell plate, an electrolyte was injected, and then a cap was covered and clamped. The electrolyte used herein was prepared by dissolving 1M LiPF$_6$ solution in a mixed solvent of EC/FEC/EMC/DEC (20/10/20/50; volume ratio).

After impregnating the prepared lithium coin half-cell for 12 hours or more, charging (CC-CV 0.1C 0.01 V 0.01C CUT-OFF) the cell in a chamber at 25° C., then the battery capacities (charge capacities) were measured, and after discharging again (CC 0.1C 1.5 V CUT-OFF) the same, the battery capacities (discharge capacities) were measured. Initial capacity efficiency of each lithium secondary battery was calculated by dividing the measured initial discharge capacity by the measured initial charge capacity, then multiplying by 100. However, the electrode of the comparative example did not have a uniform coating surface, such that an electrochemical evaluation was performed by selecting the most uniform portion. Results thereof are shown in Table 4 below.

TABLE 4

|  | Charge capacity [mAh/g] | Discharge capacity [mAh/g] | Initial efficiency [%] |
| --- | --- | --- | --- |
| Comparative Example 1 | 533 | 469 | 88.0 |
| Comparative Example 2 | 474 | 433 | 91.4 |
| Example 1 | 511 | 465 | 91.0 |

It was found that, in the case of Example 1, compared to Comparative Example 1, the charge capacity and the discharge capacity were somewhat decreased, but the initial efficiency was increased depending on the purpose of magnesium doping. In addition, as described above, even when preparing the anode active material slurry, gas is not generated and the uniformity of the coated electrode may be secured.

On the other hand, it was found that, in the case of Comparative Example 2, since the magnesium doping was performed as in Example 1, the initial efficiency was increased similar to Example 1, but both the charge capacity and the discharge capacity were decreased. Therefore, it is anticipated that, as silicon (Si) in the silicon oxide is ionized, it can no longer act as an active material and can no longer play a role capable of receiving lithium, such that the charge capacity will be reduced, and equally, the discharge capacity also will be decreased together. As such, when the battery capacity is reduced, it is not possible to implement the high capacity and high energy density any more, which are advantages of the silicon-based anode active material.

What is claimed is:

1. An anode active material for a lithium secondary battery comprising:
    a silicon oxide which comprises a carbon coating layer formed on a surface thereof, and is doped with magnesium,
    wherein a ratio of peak area at 1303 eV to a sum of a peak area at 1304.5 eV and a peak area at 1303 eV, which appear in a Mg1s spectrum when measuring by X-ray photoelectron spectroscopy (XPS), is 60% or less.

2. The anode active material for a lithium secondary battery according to claim 1, wherein a content of magnesium hydroxide remaining on the surface is less than 0.05% by weight based on a total weight of the silicon oxide.

3. The anode active material for a lithium secondary battery according to claim 1, wherein a content of the doped magnesium is 7 to 17% by weight based on the total weight of the silicon oxide.

4. The anode active material for a lithium secondary battery according to claim 1, wherein a carbon content in the coating layer is 3 to 12% by weight based on the total weight of the silicon oxide.

5. The anode active material for a lithium secondary battery according to claim 1, wherein the silicon oxide is SiOx and 0<x<2.

6. The anode active material for a lithium secondary battery according to claim 1, wherein the silicon oxide has a silicon crystal average particle diameter of 20 nm or less.

7. The anode active material for a lithium secondary battery according to claim 1, wherein the carbon of the coating layer comprises amorphous carbon, carbon nanofibers, carbon nanotubes, graphite, graphene, graphene oxide, reduced graphene oxide, or a mixture thereof.

8. An anode active material slurry for a lithium secondary battery, comprising the anode active material according to claim 1.

9. The anode active material slurry for a lithium secondary battery according to claim 8, wherein the slurry has a pH of less than 10.

10. The anode active material slurry for a lithium secondary battery according to claim 8, wherein the slurry has a viscosity of 4,000 cPs or more.

11. A lithium secondary battery comprising:
- a cathode;
- an anode which comprises the anode active material for a lithium secondary battery according to claim 1; and
- a separation membrane interposed between the cathode and the anode.

* * * * *